US011144763B2

(12) United States Patent
Yamasaki et al.

(10) Patent No.: US 11,144,763 B2
(45) Date of Patent: Oct. 12, 2021

(54) INFORMATION PROCESSING APPARATUS, IMAGE DISPLAY METHOD, AND NON-TRANSITORY COMPUTER-READABLE STORAGE MEDIUM FOR DISPLAY CONTROL

(71) Applicant: CANON KABUSHIKI KAISHA, Tokyo (JP)

(72) Inventors: Masayoshi Yamasaki, Kawasaki (JP); Kotaro Yano, Tokyo (JP); Takahisa Yamamoto, Kawasaki (JP); Satoshi Yashiro, Yokohama (JP); Hideo Noro, Tokyo (JP); Shunsuke Nakano, Inagi (JP); Atsuo Nomoto, Tokyo (JP); Kiyotaka Takahashi, Kawasaki (JP); Koji Makita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/365,421

(22) Filed: Mar. 26, 2019

(65) Prior Publication Data

US 2019/0303678 A1 Oct. 3, 2019

(30) Foreign Application Priority Data

Apr. 2, 2018 (JP) .............................. JP2018-070597

(51) Int. Cl.
*G06K 9/00* (2006.01)
(52) U.S. Cl.
CPC ..... *G06K 9/00718* (2013.01); *G06K 9/00362* (2013.01); *G06K 9/00671* (2013.01)

(58) Field of Classification Search
CPC ........... G06K 9/00671; G06K 2209/27; G06K 9/00684; G06K 9/00778; G06K 9/46; G06T 19/006
See application file for complete search history.

(56) References Cited

U.S. PATENT DOCUMENTS

| 2011/0098056 A1* | 4/2011 | Rhoads | ..................... G09G 5/00 455/456.1 |
| 2011/0212717 A1* | 9/2011 | Rhoads | ................... G06F 16/58 455/420 |
| 2012/0020643 A1* | 1/2012 | Kato | ................... H04N 21/4325 386/241 |
| 2012/0069131 A1* | 3/2012 | Abelow | ............... G06Q 10/067 348/14.01 |

(Continued)

FOREIGN PATENT DOCUMENTS

JP 2011-128838 A 6/2011

OTHER PUBLICATIONS

Google Now—Google Glass Help—http://supportgoogle.com/glass/answer/3063237, Jan. 30, 2019, pp. 1-3.

*Primary Examiner* — Guillermo M Rivera-Martinez
(74) *Attorney, Agent, or Firm* — Canon U.S.A., Inc. IP Division (57) ABSTRACT

An information processing apparatus includes detecting a predetermined object from a captured image, identifying an attribute of the detected object, determining a presentation method of presented information representing the attribute based on a detection state of the detected object, displaying the presented information and the captured image based on the determined presentation method.

16 Claims, 10 Drawing Sheets

(56) References Cited

U.S. PATENT DOCUMENTS

| | | | |
|---|---|---|---|
| 2012/0120312 A1* | 5/2012 | Yamasaki | H04N 5/44513 348/461 |
| 2012/0208592 A1* | 8/2012 | Davis | H04N 5/23293 455/556.1 |
| 2014/0096021 A1* | 4/2014 | Gowen | G06F 3/04845 715/738 |
| 2014/0104313 A1* | 4/2014 | Matsumoto | G06K 9/60 345/632 |
| 2014/0232739 A1* | 8/2014 | Kim | G09G 5/14 345/592 |
| 2015/0139534 A1* | 5/2015 | Komatsu | G06T 7/536 382/154 |
| 2018/0039853 A1* | 2/2018 | Liu | G06K 9/72 |
| 2018/0204111 A1* | 7/2018 | Zadeh | G06K 9/3233 |
| 2018/0253906 A1* | 9/2018 | Tran | G06T 7/20 |
| 2018/0300631 A1* | 10/2018 | Roy | G06N 3/088 |

\* cited by examiner

INFORMATION PROCESSING APPARATUS, IMAGE DISPLAY METHOD, AND NON-TRANSITORY COMPUTER-READABLE STORAGE MEDIUM FOR DISPLAY CONTROL

BACKGROUND

Field

The present disclosure relates to a presentation technique of information representing an attribute of an object in an image.

Description of the Related Art

There is a technique of detecting a predetermined object from a still image or a moving image (herein below referred to as "a captured image") captured by a camera and presenting attribute information of the detected object. The attribute information is, for example, a gender, an age, and the like of a person detected from a captured image. Such attribute information is, for example, acquired through estimation based on the image of the person detected from the captured image or matching of the detected person with a person with his/her attribute information pre-registered in a dictionary to check if they are identical. The presentation technique of attribute information can be applied to marketing for analyzing visitors to events and commercial facilities, a case of searching a specific person such as a lost child from among a group, and the like.

The attribute information to be presented includes brief information, which is simple information, such as a name, and detailed information, which is more detailed. As a method for presenting the brief information, methods such as annotation and notification are known.

The annotation is a method often used in augmented reality (AR). In the annotation, brief information associated with an object in a captured image, such as a name, is superimposed close to the object. An example of the annotation is a service called Sekai Camera® provided by Tonchidot Corporation in 2009 to 2014. This service uses annotation called "Air Tag®". MetaPro® produced by META Company introduces an example of superimposing balloon-like annotation on a real sight in a promotion video in a see-through head mounted display (HMD).

The notification is a method used to notify a user of a predetermined event. Examples of the notification are call notification and caller's number display on a phone, and notification of an e-mail and a social networking service (SNS) on a Smartphone. Google Now®, which is an application for Google Glass® provided by Google, is an example of the notification, in which information is displayed in front of a user in accordance with a position and time of the user.

The annotation and the notification are effective to notify a user of brief information. The user wishes to know more detailed information than the brief information in some cases. Japanese Patent Laid-Open No. 2011-128838 discloses an image display apparatus displaying, from brief information selected by a user, associated detailed information. In this image display apparatus, a virtual object image is superimposed on a captured image of a real space. The image display apparatus displays the virtual object image not to hide an object approaching to the user in the real space. Consequently, the image display apparatus can make the user notice the approaching object while displaying the virtual object. In these applications, the annotation is required to be displayed to be easily viewable without preventing the user from understanding information due to superimposition between the captured image and the annotation or between the annotations.

The brief information such as the annotation and the notification and other information are displayed on the same display screen in some cases. Such cases can result in an issue in which a real object on an image is hidden by presented information, in which displayed information is difficult to be viewed, or in which understanding of information is difficult.

SUMMARY

One aspect of the present disclosure provides an information processing apparatus presenting information to facilitate visual recognition of an object in an image and understanding of information by a user.

An information processing apparatus includes a detection unit configured to detect a predetermined object from a captured image, an identification unit configured to identify an attribute of the detected object, a decision unit configured to determine a presentation method of presented information representing the attribute based on a detection state of the detected object, and a display control unit configured to display the presented information and the captured image on a display based on the determined presentation method.

Further features will become apparent from the following description of exemplary embodiments (with reference to the attached drawings).

DESCRIPTION OF THE EMBODIMENTS

Herein below, embodiments will be described in detail with reference to the drawings.

First Embodiment

In an embodiment, an object is detected from a captured image serving as a two-dimensional image acquired by capturing an image of a real space, and in a case in which an area ratio of a region of information to be presented (presented information) to a size of the captured image exceeds a predetermined threshold value, a method for presenting presented information is changed. The presented information is generated based on information associated with the object such as attribute information.

Figure 1:
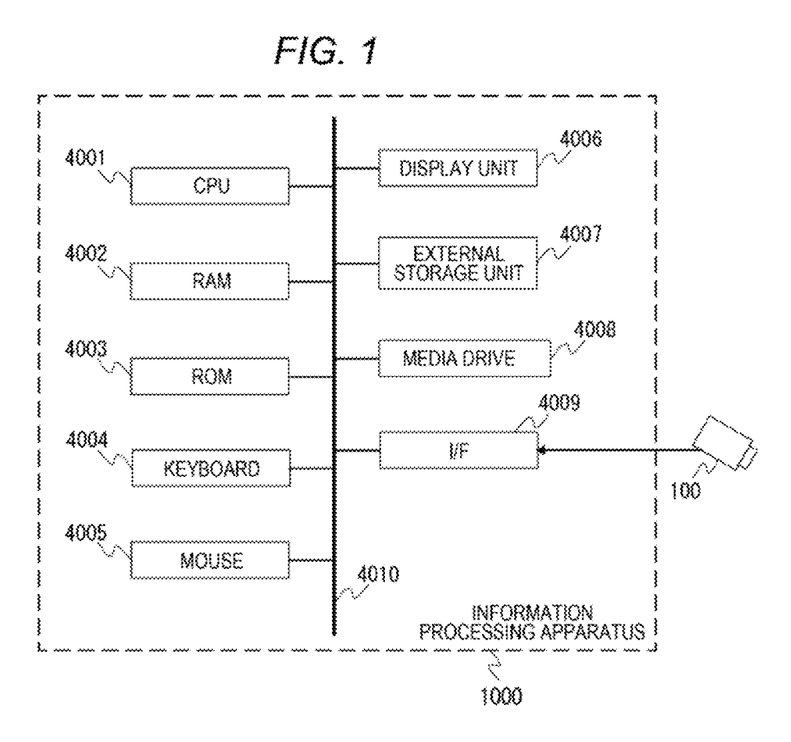
FIG. 1 is a hardware configuration diagram of an information processing apparatus.

FIG. 1 is a hardware configuration diagram of an information processing apparatus according to the present embodiment. A camera 100 serving as an image capturing device is connected to an information processing apparatus 1000. The information processing apparatus 1000 is a computer including a central processing unit (CPU) 4001, a random access memory (RAM) 4002, and a read only memory (ROM) 4003. The information processing apparatus 1000 includes a keyboard 4004 and a mouse 4005 as input devices. The information processing apparatus 1000 includes a display unit 4006 as an output device. The information processing apparatus 1000 includes an external storage unit 4007, a media drive 4008, and an I/F 4009. The CPU 4001, the RAM 4002, the ROM 4003, the keyboard 4004, the mouse 4005, the display unit 4006, the external storage unit 4007, the media drive 4008, and the I/F 4009 are connected to enable mutual communication via a bus 4010.

The CPU 4001 uses the RAM 4002 as an operation region to execute a computer program stored in at least one or more of the ROM 4003, the external storage unit 4007, or a medium inserted in the media drive 4008. For example, the CPU 4001 executes a boot program stored in the ROM 4003 at the time of activation. The CPU 4001 executes a program stored in at least either the external storage unit 4007 or the media inserted in the media drive 4008 to execute processing according to the present embodiment. In this manner, the CPU 4001 controls operation of the information processing apparatus 1000.

The keyboard 4004 and the mouse 4005 are examples of the input device and transmit various instructions to the CPU 4001 when a user operates the keyboard 4004 and the mouse 4005. The input device can be another general input device such as a touch panel as long as the input device enables the user to input instructions through operation. The display unit 4006 is, for example, a display. The display unit 4006 displays a processing result provided by the CPU 4001 as an image, a character, and the like. In the present embodiment, the display unit 4006 displays a captured image by the camera and an image, a character, and the like of presented information associated with an object in the captured image such as a person.

The external storage unit 4007 is a high-capacity storage unit such as a hard disk drive (HDD) or a solid state drive (SSD). The external storage unit 4007 stores an operating system (OS), a computer program causing the information processing apparatus 1000 to execute processing, and various data. Examples of the various data are virtual object model data and data described below as known information.

The media drive 4008 reads out a program and data from the medium such as a CD-ROM and a DVD-ROM and writes a program and data in the medium. It is to be noted that the program and the data described above as those stored in the external storage unit 4007 can partially or entirely be stored in the medium. The program and the data read out from the medium by the media drive 4008 are transferred to the external storage unit 4007 and the RAM 4002.

The I/F 4009 is an interface transmitting and receiving data to and from an external device. In the present embodiment, the camera 100 is connected to the I/F 4009 as the external device. The I/F 4009 is an analog video port, a digital input/output port such as an IEEE 1394, a DVI port for outputting a composite image, or the like. Data received by the I/F 4009 is stored in the RAM 4002 and the external storage unit 4007.

The camera 100 captures an image of a real space and generates a captured image serving as a two-dimensional image such as a moving image and a still image. The I/F 4009 receives the captured image from the camera 100.

Figure 2:
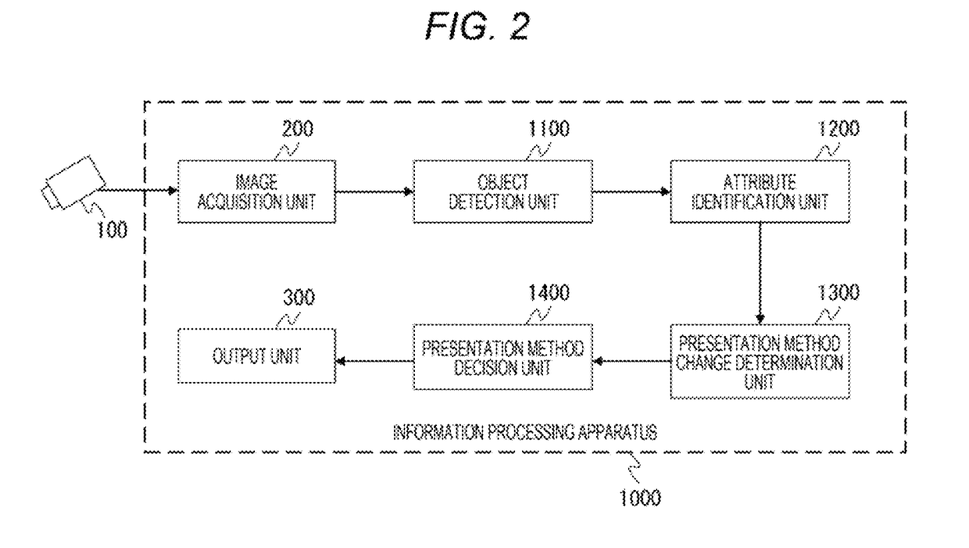
FIG. 2 is a functional component diagram of the information processing apparatus.

FIG. 2 is a functional component diagram of such an information processing apparatus 1000. The information processing apparatus 1000 includes an image acquisition unit 200, an object detection unit 1100, an attribute identification unit 1200, a presentation method change determination unit 1300, a presentation method decision unit 1400, and an output unit 300. The CPU 4001 executes the computer program to cause the information processing apparatus 1000 to implement the functions of the above respective components. Alternatively, at least some of the functions of the above respective components of the information processing apparatus 1000 can be implemented by hardware.

The image acquisition unit 200 acquires a captured image from the camera 100 via the I/F 4009. The image acquisition unit 200 can be implemented by the media drive 4008. In this case, the image acquisition unit 200 acquires a stored image from a portable medium such as a memory card. Alternatively, the image acquisition unit 200 can be implemented by a configuration in which a captured image is acquired from the camera 100 via a network. The image acquisition unit 200 transmits a captured image acquired from the camera 100 to the object detection unit 1100.

Figure 3:
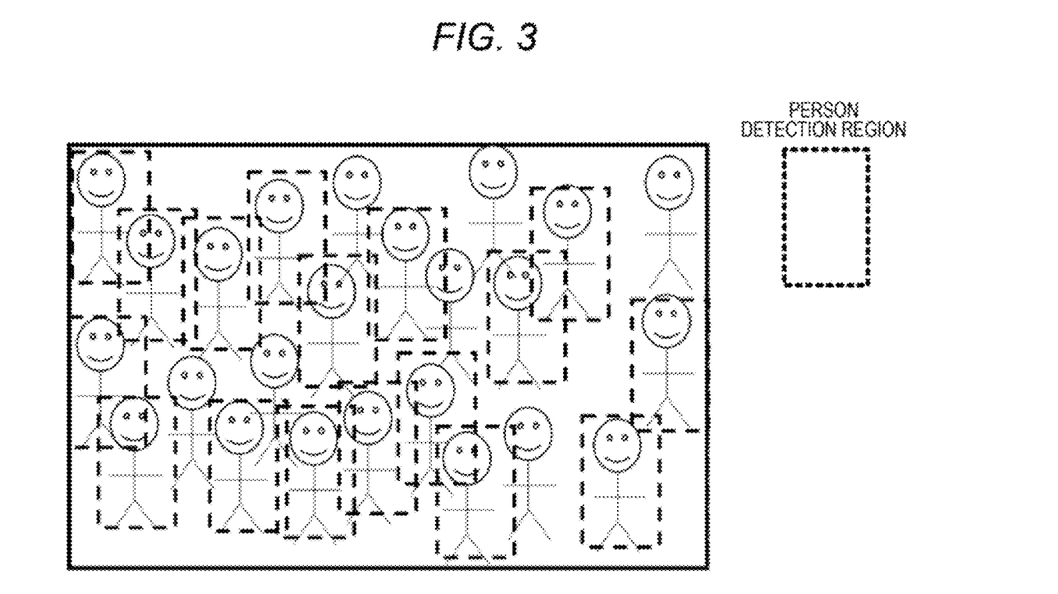
FIG. 3 illustrates a case in which persons are detected from a captured image.

The object detection unit 1100 detects an object contained in the captured image acquired from the image acquisition unit 200. The object detection unit 1100 detects the object using a known technique such as outline detection, image processing using respective feature amounts or the like, and a method using machine learning. FIG. 3 illustrates a case in which persons are detected as objects from the captured image. The object detection unit 1100 transmits object information representing the detected object to the attribute identification unit 1200. The object information includes, for example, an image of the detected object, a kind of the object (a person, a thing, or the like), a position of the object image in the captured image, and a region of the object image (a person detection region in FIG. 3 or the like).

Figure 4:
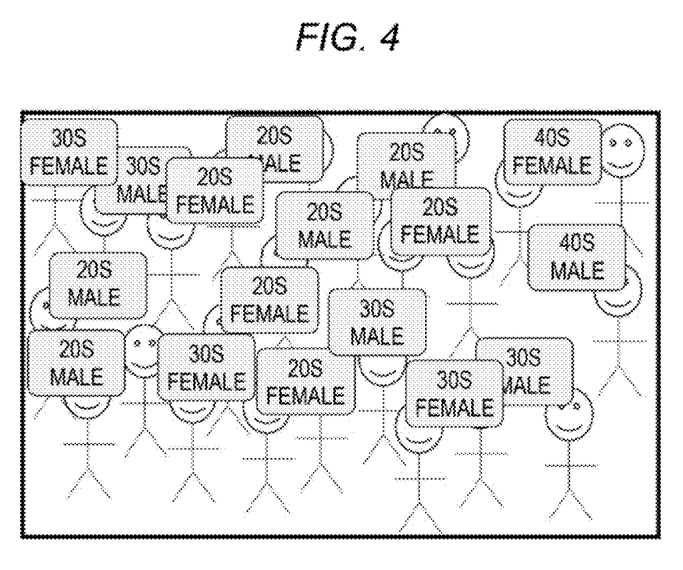
FIG. 4 illustrates attribute information.

The attribute identification unit 1200 identifies an attribute of the detected object based on the object information acquired from the object detection unit 1100 and acquires attribute information representing the attribute. For example, in a case in which the detected object is a person, the attribute identification unit 1200 identifies the person's gender, age, and the like as attributes of the person. A known technique such as a method using deep learning is used as the method for identifying attributes. The attribute identification unit 1200 can also register a pair consisting of a face image and personal information such as a name and an address in a dictionary in advance and search the personal information from the object information (face image) to acquire the attribute information. In the present embodiment, the attribute identification unit 1200 identifies the gender and age of a detected person as attribute information. The attribute identification unit 1200 transmits the identified attribute information to the presentation method change determination unit 1300. FIG. 4 illustrates the attribute information. The genders and ages (attribute information) of all of the objects (all of the persons) in the captured image are identified, and the gender and age of each person are superimposed on the respective person.

The presentation method change determination unit 1300 determines whether a presentation method is changed based on the object information and the attribute information acquired from the attribute identification unit 1200. Specifically, the presentation method change determination unit 1300 determines a change of the presentation method based on an area ratio of a region for presenting presented information to a size of the captured image. In a case in which the area ratio exceeds a predetermined threshold value, the presentation method change determination unit 1300 changes the presentation method to decrease the area ratio of the region for presenting the presented information. The threshold value is set by the user. The presentation method change determination unit 1300 notifies the presentation method decision unit 1400 of a determination result of whether the presentation method is changed.

The presentation method decision unit 1400 determines a method for presenting the presented information based on the notification of the determination result of whether the presentation method is changed acquired from the presentation method change determination unit 1300. The presented information is expressed as a graph, a character, a number, a color, and combination thereof. The presentation method is determined in accordance with the presented information.

Figure 5:
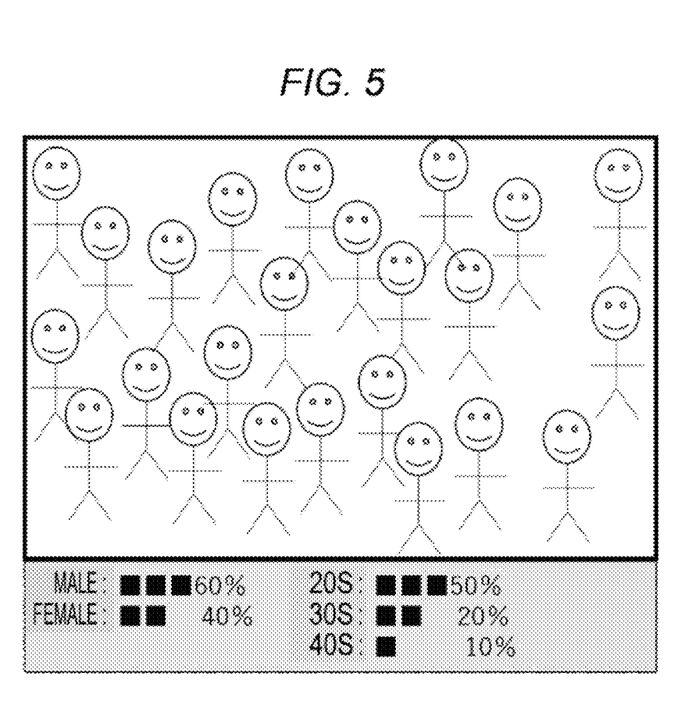
FIG. 5 illustrates a display example of a method for presenting presented information.
Figure 6:
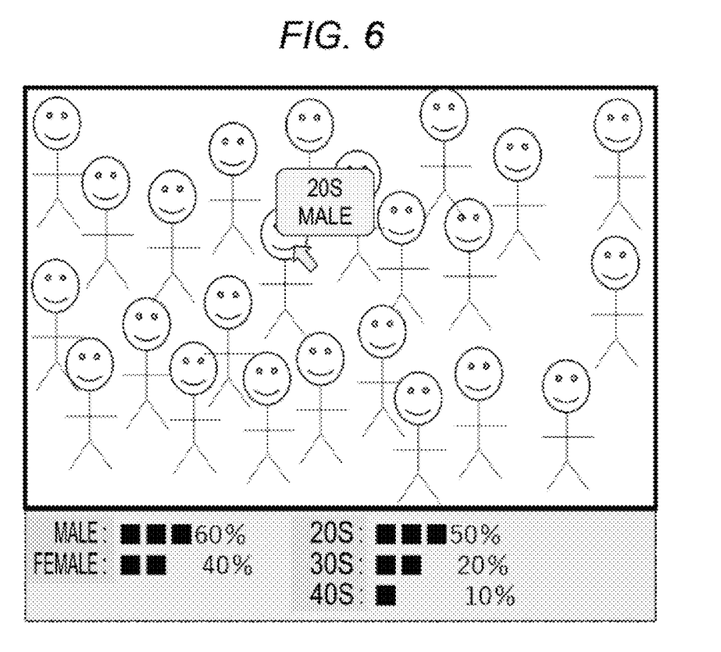
FIG. 6 illustrates a display example of individual presented information.

FIG. 5 illustrates a display example of the method for presenting the presented information. In FIG. 5, attribute names (attribute values) are expressed as character strings, and the respective percentages are expressed as values and histograms (the number of symbols). The presented information is presented at the lower part of the captured image. In a case in which one wishes to know visitor types in an event or the like, such an example facilitates visual understanding of persons of which genders and ages are interested in the event. Also, the presentation method decision unit 1400 can determine a presentation method to display individual presented information of each detected object (person). FIG. 6 illustrates a display example of the individual presented information. For example, when the user selects via the input device an object (person) with presented information that the user wishes to display, the presentation method decision unit 1400 displays the individual presented information of the object. In this manner, the presentation method decision unit 1400 determines a presentation method to display the presented information outside the region of the captured image or on the captured image. In the example in FIG. 6, the male person in his 20s is prominently displayed. The presentation method decision unit 1400 transmits the determined presentation method to the output unit 300.

The output unit 300 displays image data provided with the presented information on the display unit 4006 based on the presentation method acquired from the presentation method decision unit 1400. The display unit 4006, for example, superimposes the image of the presented information on the captured image. The display unit 4006 displays the image illustrated in FIG. 5 or FIG. 6.

Figure 7:
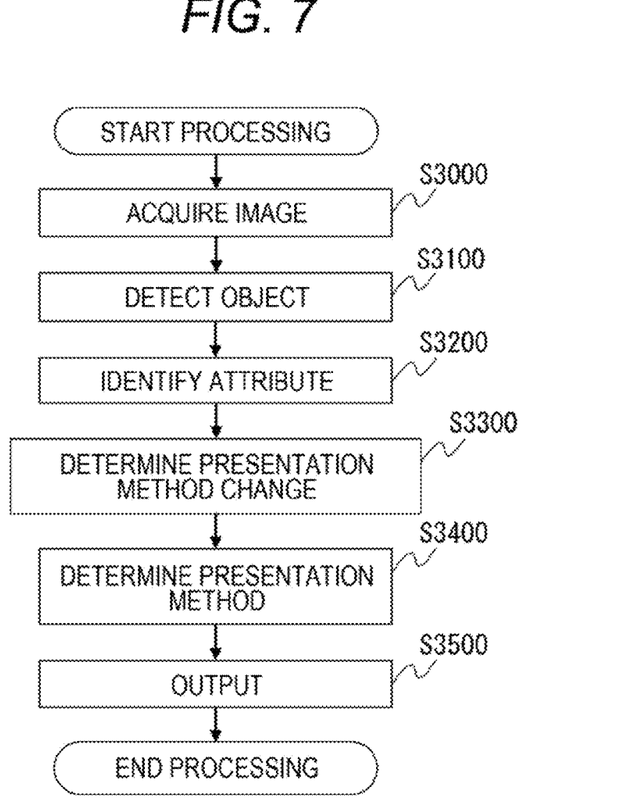
FIG. 7 is a flowchart illustrating an image display method.

An image display method of the information processing apparatus 1000 configured as above will now be described. FIG. 7 is a flowchart illustrating an image display method according to the present embodiment.

In the information processing apparatus 1000, the image acquisition unit 200 acquires a captured image captured by the camera 100 (S3000). The object detection unit 1100 detects an object from the captured image acquired (S3100). The attribute identification unit 1200 identifies an attribute of the detected object (S3200). The presentation method change determination unit 1300 determines whether a presentation method is changed based on presented information (S3300). The presentation method decision unit 1400 determines a presentation method of the presented information based on the presented information and whether the presentation method is changed (S3400). The output unit 300 displays an image of the presented information and the captured image at positions on the display unit 4006 based on the presentation method (S3500).

The above-described information processing apparatus 1000 according to the present embodiment changes a method for presenting presented information based on an area ratio of a region for presenting the presented information to a size (area) of a captured image. Accordingly, presented information can be displayed without lowering visibility of an object in a real space. This facilitates understanding of presented information, such as attribute information, about an object by a user.

The presentation method change determination unit 1300 can determine a change of a presentation method based on parameters other than the area ratio of a region for presenting presented information to a size of a captured image. For example, the presentation method change determination unit 1300 can determine a change of a presentation method based on an overlap ratio between the region of the image of the detected object and the presentation region of the presented information or the number of detected objects. In a case in which the size of the presentation region of the presented information is equal regardless of the size of the image of the detected object, the ratio of the presentation region of the presented information to the size of the captured image increases in proportion to the number of detected objects. Hence, the presentation method change determination unit 1300 can derive the area ratio of the presentation region of the presented information to the size of the captured image based on the size of the presentation region of the presented information resulting from the number of detected objects. In this manner, the presentation method change determination unit 1300 can determine whether the presentation method is changed based on the number of detected objects.

The presentation method change determination unit 1300 can determine whether a presentation method is changed based on attribute information that a plurality of detected objects have in common. For example, in a case of FIG. 4, the gender is classified into two types: male and female, and the age is classified into three types: 20s, 30s, and 40s. In a case in which the attribute information is presented as illustrated in FIG. 5 after classification, the presentation method change determination unit 1300 compares the presentation region of the presented information before classification with that after classification and changes the presentation method in a case in which the presentation region of the presented information after classification is smaller. In this manner, the presentation method change determination unit 1300 can determine whether the presentation method is changed based on attribute information that the detected objects have in common.

Second Embodiment

In another embodiment, in a state in which multiple objects are detected from a captured image serving as a two-dimensional image acquired by capturing an image of a real space, presented information that satisfies attribute information or conditions specified by the user is displayed. Accordingly, the user can easily find specific targets from the multiple objects. Here, the case where selling beer in a stadium will be described as an example. A camera captures an image of seats located in the stadium. An information processing apparatus analyzes the captured image to determine a seat area where it is estimated that beer sales are good. Consequently, an area where beer sellers can be intensively allocated is obtained and efficient beer sales can be obtained.

Figure 8:
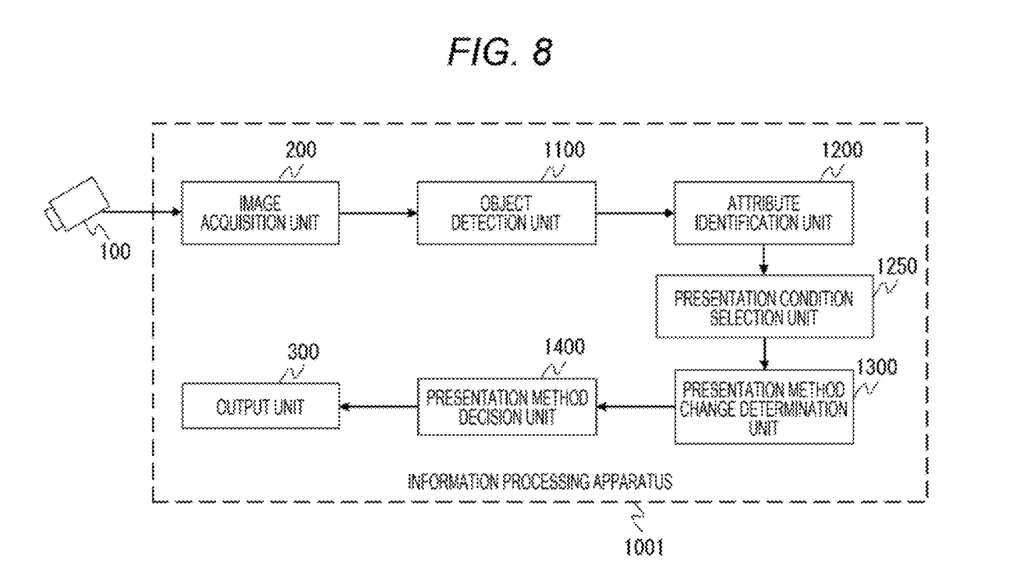
FIG. 8 is a functional component diagram of an information processing apparatus.

FIG. 8 is a functional component diagram of an information processing apparatus achieving such processing. In FIG. 8, identical components to those in the information processing apparatus 1000 in FIG. 2 are illustrated with the same reference signs. Description of the duplicate components is omitted. A hardware configuration of an information processing apparatus 1001 is similar to that of the information processing apparatus 1000 according to the first embodiment illustrated in FIG. 1.

The information processing apparatus 1001 includes a presentation condition selection unit 1250 in addition to the components in FIG. 2. The CPU 4001 executes the computer program to cause the information processing apparatus 1001 to implement the functions of the above respective components. Alternatively, at least some of the functions of the above respective components of the information processing apparatus 1001 can be implemented by hardware.

The presentation condition selection unit 1250 selects attribute information to be presented from among attribute information based on a predetermined presentation condition. As a result, which attribute information is to be presented is determined. The presentation condition is determined by selection by the user or automatic selection based on attribute information appropriate to a use case. A case in which the presentation condition is determined by automatic selection based on attribute information appropriate to a use case will be described, where the case of selling beer in a stadium is used as an example. In a case of selling beer, a condition of "male and 30s or over" is derived from statistical data for general beer buyers. Hence, a presentation condition that the presented information be presented in a case in which the attribute information is "male" and "30s or over" is automatically determined. In this manner, by determining a presentation condition based on statistical data or prior information appropriate to a use case, the presentation condition selection unit 1250 can automatically select attribute information required for presentation.

Figure 9:
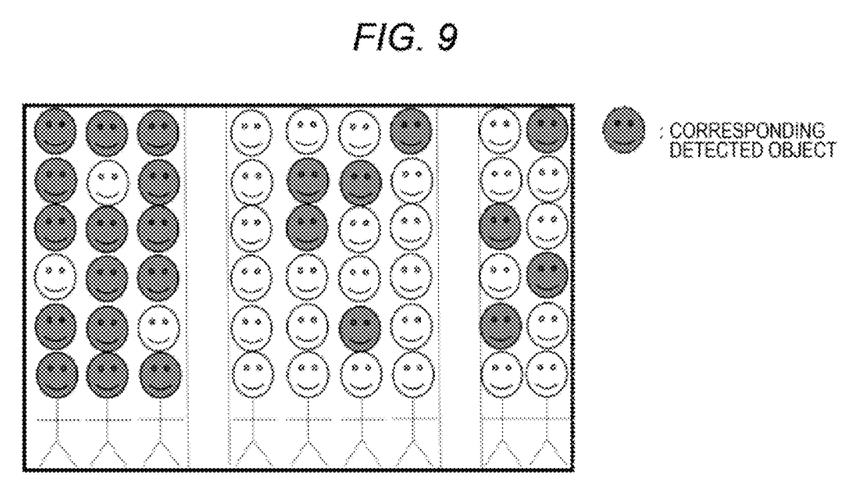
FIG. 9 illustrates an example of changing colors of objects that satisfy a presentation condition.

The presentation method decision unit 1400 changes a display state of an object with the attribute information selected by the presentation condition selection unit 1250. FIG. 9 illustrates an example of changing a display state in which colors of objects that satisfy a presentation condition are changed. Based on this display, the user can easily determine from color distribution a seat area in which it is estimated that beer sales are good in a situation in which multiple objects are detected. Changing a display state is not limited to changing a color and can be done in any way in a similar manner to that of the first embodiment.

Figure 10:
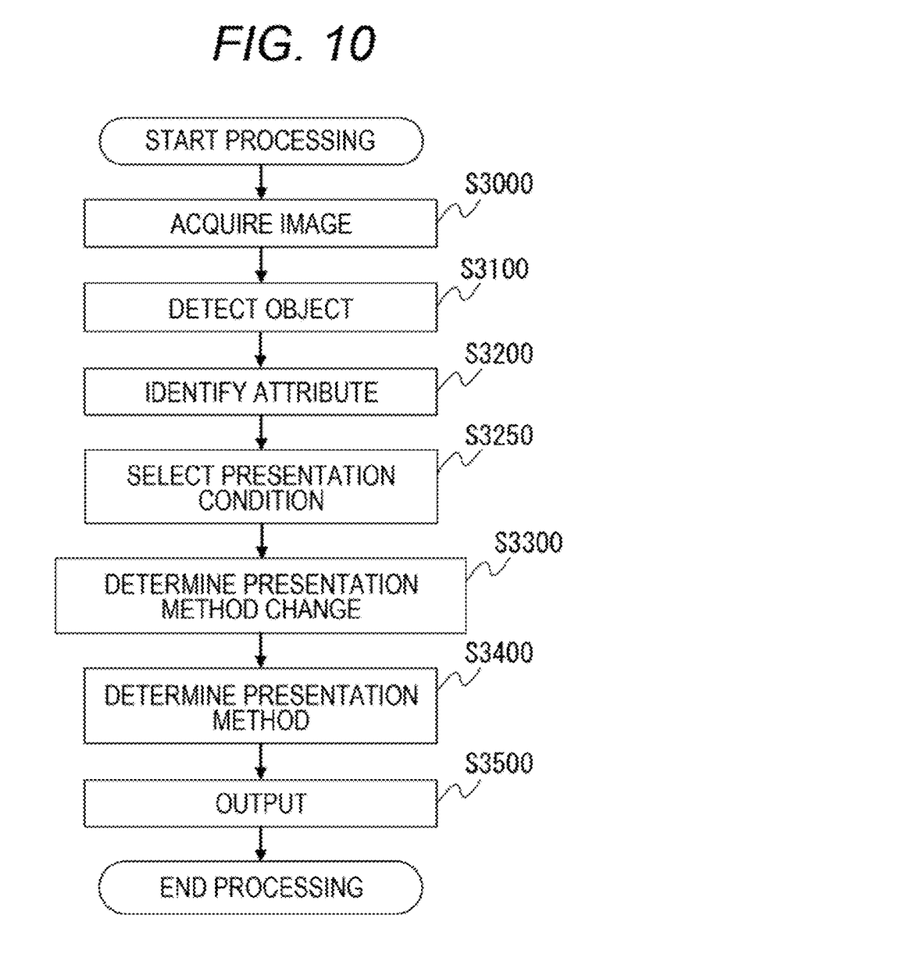
FIG. 10 is a flowchart illustrating an image display method.

An image display method used by the information processing apparatus 1001 configured as above will be described. FIG. 10 is a flowchart illustrating an image display method according to the present embodiment. Identical steps to those in the first embodiment in FIG. 7 are illustrated with the same step numbers.

In the information processing apparatus 1001, the image acquisition unit 200 acquires a captured image captured by the camera 100 (S3000). The object detection unit 1100 detects an object from the captured image acquired (S3100). The attribute identification unit 1200 identifies an attribute of the detected object (S3200). The presentation condition selection unit 1250 selects attribute information to be presented based on a predetermined presentation condition (S3250). This processing by the presentation condition selection unit 1250 can be performed at any time after the processing in step S3000, after the processing in step S3100, or after the processing in step S3200 as long as the processing is performed after acquisition of the captured image. The presentation method change determination unit 1300 determines whether a presentation method is changed based on presented information (S3300). The presentation method decision unit 1400 determines a presentation method of the presented information based on the presented information and whether the presentation method is changed (S3400). The output unit 300 displays an image of the presented information and the captured image at positions on the display unit 4006 based on the presentation method (S3500).

In the above-described information processing apparatus 1001 according to the present embodiment, by specifying attribute information to be displayed or a presentation condition, information of only objects that satisfy the predetermined presentation condition can be displayed from multiple detected objects. Accordingly, the user can easily find a specific target in a situation in which multiple objects are detected.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-070597, filed Apr. 2, 2018, which is hereby incorporated by reference herein in its entirety.

What is claimed is:
1. An information processing apparatus comprising:
one or more memories storing instructions; and
one or more memories processors, which when executed the instructions, causes the information processing apparatus to:

detect one or more objects from a captured image;
identify attributes of each the detected objects;
determine a presentation method of information representing the identified attributes; and
display, based on the determined presentation method, the information using the determined presentation method and the captured image on a display,
wherein in a case where an area ratio of a size of a region for presenting the information to a size of the captured image exceeds a predetermined threshold values, the presentation method is determined to be changed so as to decrease the area ratio of the region for presenting the information.

2. The information processing apparatus according to claim 1, wherein the one or more processors causes the apparatus to determine the presentation method based on an overlap ratio between a region of an image of the detected objects and the region for presenting the presented information.

3. The information processing apparatus according to claim 1, wherein the one or more processors causes the apparatus to determine the presentation method based on a number of detected objects.

4. The information processing apparatus according to claim 1, wherein the one or more processors causes the apparatus to determine, based on the area ratio, the presentation method to superimpose the information on the captured image.

5. The information processing apparatus according to claim 4, wherein the one or more processors causes the apparatus to determine, a case the area ratio does not exceed the predetermined threshold value, the presentation method to display the attributes of the detected object as the information so as to make the information correspond to the object.

6. The information processing apparatus according to claim 5, wherein the one or more processors causes the apparatus to determine, in a case the area ratio exceeds the predetermined threshold value, the presentation method to display the information outside the captured image.

7. The information processing apparatus according to claim 5, wherein, in a case the area ratio exceeds the predetermined threshold value, the one or more processors causes the apparatus to determine the presentation method to display a statistics amount of the attributes of the plurality of objects as the information outside the captured image.

8. The information processing apparatus according to claim 7, wherein the one or more processors causes the apparatus to determine the presentation method to display the statistics amount of the attributes as a number or a percentage.

9. The information processing apparatus according to claim 7, wherein the one or more processors causes the apparatus to determine the presentation method to display the statistics amount of the attributes as a graph or a symbol.

10. The information processing apparatus according to claim 7, wherein the one or more processors causes the apparatus to determine the presentation method to display the statistics amount of the attributes of the plurality of objects as the information outside the captured image and to superimpose the attribute of a specified object out of the plurality of objects on the captured image to make the attributes of the object correspond to the object.

11. The information processing apparatus according to claim 1, wherein the objects are people and the attributes includes a gender.

12. The information processing apparatus according to claim 1, wherein the objects are people and the attributes includes an age.

13. The information processing apparatus according to claim 1, wherein the one or more processors further causes the apparatus to:
select an attribute value of the attributes targeted for presentation based on a presentation condition, and
change a display state of an object corresponding to the selected attribute value.

14. The information processing apparatus according to claim 13, wherein the presentation condition is determined based on a purpose of use.

15. An image display method comprising:
detecting one or more objects from a captured image;
identifying attributes of each the detected objects;
determining a presentation method of information representing the identified attributes; and
displaying, based on the determined presentation method, the information using the determined presentation method and the captured image on a display,
wherein the determining determines, in a case an area ratio of a size of a region for presenting the information to a size of the captured image exceeds a predetermined threshold values, the presentation method is changed so as to decrease the area ratio of the region for presenting the information.

16. A non-transitory computer-readable storage medium storing a computer program configured to cause a computer to execute a method, the method comprising:
detecting one or more objects from a captured image;
identifying attributes of each the detected objects;
determining a presentation method of information representing the identified attributes; and
displaying, based on the determined presentation method, the information using the determined presentation method and the captured image on a display,
wherein the determining determines, in a case an area ratio of a size of a region for presenting the information to a size of the captured image exceeds a predetermined threshold values, the presentation method is changed so as to decrease the area ratio of the region for presenting the information.

* * * * *